G. E. BURT.
Horse-Rake.

No. 133,920.

2 Sheets--Sheet 1.

Patented Dec. 17, 1872.

Witnesses:
E. A. Hildreth.
S. B. Hildreth.

Inventor:
George E. Burt.

G. E. BURT.
Horse-Rake.
No. 133,920.
2 Sheets--Sheet 2.
Patented Dec. 17, 1872.
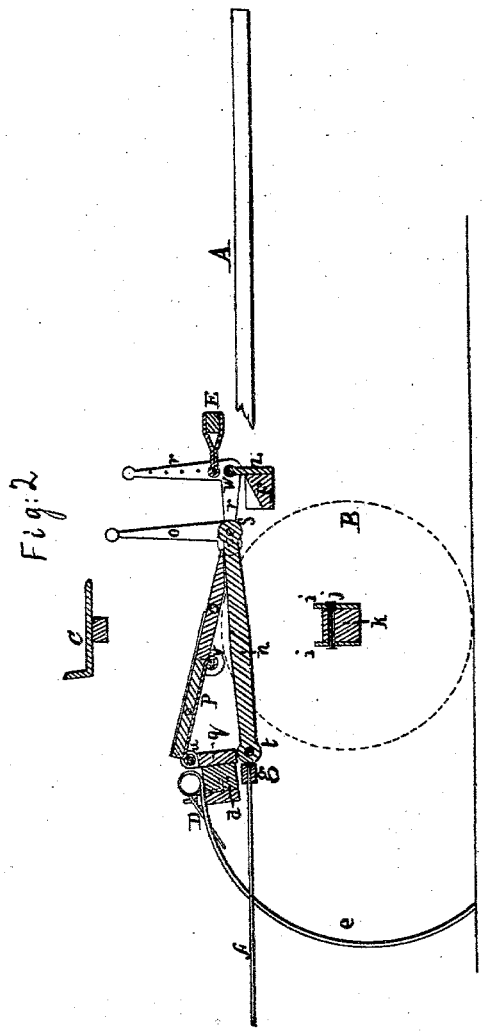
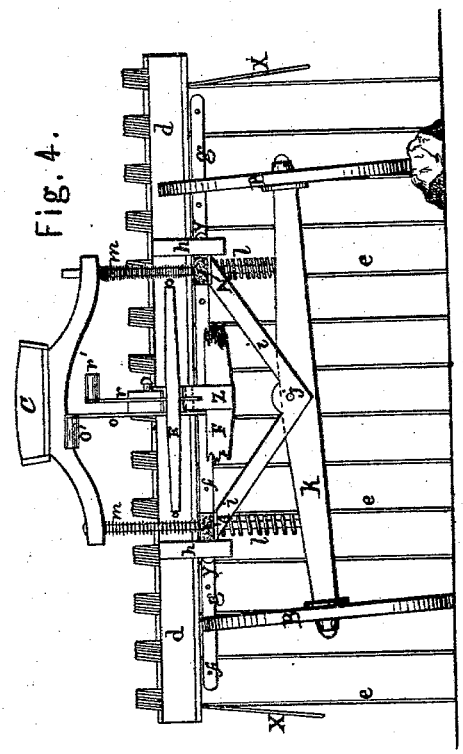
Witnesses:
E. A. Hildreth.
S. B. Hildreth.
Inventor:
George E. Burt

UNITED STATES PATENT OFFICE.

GEORGE E. BURT, OF HARVARD, MASSACHUSETTS.

IMPROVEMENT IN HORSE HAY-RAKES.

Specification forming part of Letters Patent No. 133,920, dated December 17, 1872.

*To all whom it may concern:*

Be it known that I, GEORGE E. BURT, of Harvard, in the county of Worcester and State of Massachusetts, have invented a new and useful Improvement in Horse-Rakes; and I do hereby declare that the following is a full and exact description thereof, reference being had to the accompanying drawings and to the letters of reference marked thereon, in which—

Figure 1:
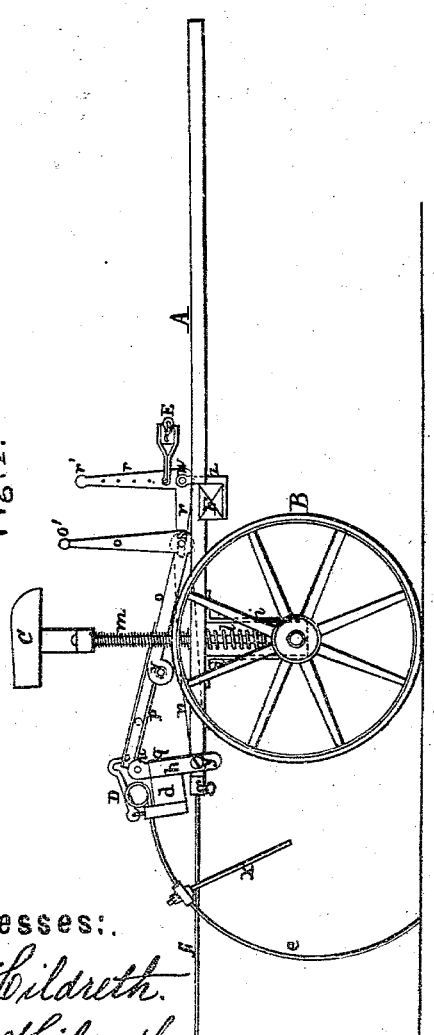
Figure 3:
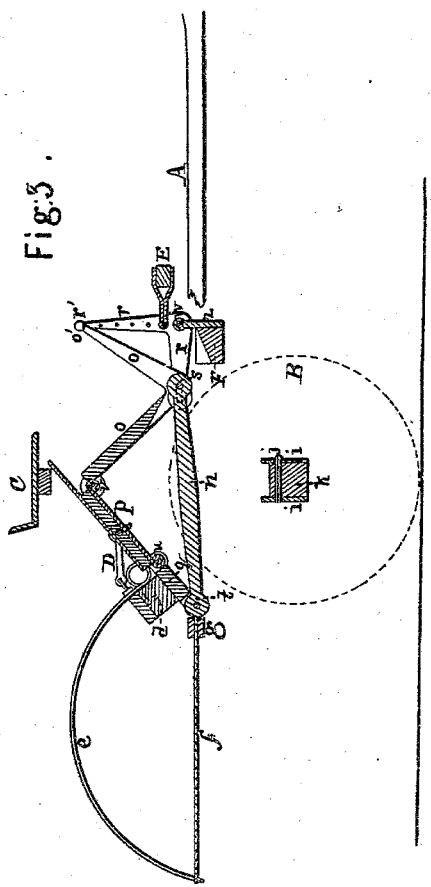

Figure 1 is a side view with the rake down in position to gather the hay; Fig. 2 is a longitudinal vertical section through the middle of the rake, showing the compound lever when the rake is in position to gather the hay; Fig. 3 is a similar section, showing the compound lever when the rake is elevated to discharge the hay; and Fig. 4 is a front view, showing the position of the rake when one wheel is passing an obstacle.

Like letters represent like parts in all the figures.

It is well known that in wire-tooth rakes, as commonly constructed, the wheels in passing over stones or other obstacles tend to lift the rake-teeth from the work, which is liable to leave bunches of hay. This is the case in most rakes where the wheels are placed either before or in the rear of the rake-head, and the nearer the wheels are placed together the more these obstacles affect the rake-teeth at the extreme ends of the rake-head. Most rakes are constructed with the wheels projecting beyond the ends of the rake-head, yet it is desirable to construct wire-teeth horse-rakes with the wheels placed inside of the longitudinal space or length of the rake-head, and thereby avoid any projection beyond the length of the rake-head, as it is necessary to construct a rake-head of considerable length in order to facilitate the raking process, and any extra projection like wheels and their hubs are objectionable, especially when on the highway and in passing through gateways; also, the operator is very liable, when raking among trees, to run the wheels against the trees and often injure them. It is also desirable to be able to rake close up to the fences, but with a projecting wheel it can not be as well done as otherwise. To overcome the above objections is the object of this invention.

The nature of my invention consists in so constructing the connecting parts of the shafts and rake-head when hung in the rear of the wheels, and so arranging them that the rake-head will have a rocking-motion to follow the irregular surface of the ground, and yet all firmly held in working-position by the operator in the seat, or by the draft of the horse when propelling the rake; also in constructing a compound lever having five flexible joints, arranged in such a manner that it may be actuated either by the operator in the seat by his foot, or by the action of the draft of the horse, separately, or they may both act together, to hold the rake-teeth down to their work, yet leaving the parts free for the operator to tilt the rake with very little effort with his foot when he wishes to discharge the hay; also in constructing and attaching an auxiliary tooth to retain the hay in the rake endwise.

To enable others skilled in the art to make and use my invention, I will proceed to describe its construction and operation.

In the accompanying drawings, B B are the supporting-wheels. A A are the shafts, which extend back to the rake-head $d$ in the rear of the wheels B B. $h\ h$ are projecting arms that connect the rake-head $d$ to the shafts A by means of the pivots $y\ y$, shown in Figs. 1 and 4. The axle $k$ is secured to rocker-braces $i\ i$, which are secured to the shafts A A at the ends of the braces by means of screws or bolts. The rocker-braces $i\ i$ are constructed lowest in the center, and clasp the axle $k$ on the sides, and are pivoted to axle $k$ by the pivot $j$ in such a manner as to allow the axle to rock freely under spiral springs $l\ l$. To hold the shafts in place and steady the operator's seat $c$, upright rods are fixed to the axle, which guide and keep in position the operator's seat $c$. $m\ m$ are coil-springs which support the operator's seat, shown in Figs. 1 and 4. F is a cross-bar which holds the shafts A A in position. $g$ is the clearer-frame, and $f\ f$ are the clearer-rods. I construct a compound lever having five distinct parts, viz., $n$, $o$, $p$, $q$, and $r$, which are pivoted together and held in position by five flexible joints, viz., $s\ v\ u\ t\ w$. The parts of this compound lever are so constructed and arranged that the length of the sides of the angles may be changed from the position shown in Fig. 2 to that shown in Fig 3. The part $o$ projects upward, to which I affix the foot-rest $o'$. The part $r$ projects upward, and is provided with holes and foot-rest $r'$. The whiffletree E may be attached by a pivot to any of the holes in the arm $r$ at any desirable distance from the pivot $w$. The pivot $w$ is held by a standard, $z$, secured to the cross-bar F. In the drawings this standard $z$ is secured to the cross-bar, projecting upward to receive the pivot. If desirable, it can be reversed, bringing the whiffletree under the shafts, with the same effect. The arms $h\ h$ are firmly fixed to the rake-head by screws, and the rake-head is free to rock on the pivots $y\ y$. $x\ x$ are auxiliary teeth, attached to the end teeth $e\ e$ by means of clamps. D is a hook, which, when hooked on the stud in the arm $p$, holds the rake up while going from field to field. The pivots $y\ y$ may be placed as high as the center of the rake-head $d$ with the same effect.

Operation.

When this rake is put in operation in the field, with a horse in the shafts and operator in the seat, it moves forward like other horse-rakes; but when one wheel passes over an obstacle the axle, being pivoted to the rocker-braces in the center, allows the wheel to rise over such obstacle without raising the rake-head or teeth, the springs $l$ and $m$ supporting the shafts and the driver's seat in a position nearly parallel with the ground. Thus the wheels may be placed inside of the rake-head without difficulty, and all the desirable features of being able to rake close up to trees and fences and the convenience of passing gates or bars are secured, the rake-teeth following the ground more evenly than when the wheels are attached outside of the rake-head, as in the usual construction, (see Fig. 4.) It will also be seen that there is a rocking motion given to the head $d$, caused by the projecting arms $h\ h$ resting on the pivots $y\ y$, which allows the horse to stand on an elevation, or the wheels to pass over elevations and depressions in the surface of the ground, and yet the rake-teeth follow all these irregularities without skipping or leaving the hay. The teeth are held in position to work by means of the compound lever $n\ o\ p\ q\ r$. The operator, in the seat, places his foot against the foot-rest $r'$ and presses forward. This exerts an upward force on the three-sided lever $n\ o\ p\ q$, and the rake-head is turned backward on the pivots $y\ y$, and a powerful downward pressure is exerted on all the teeth. The draft of the horse may also be made to act more or less, as desirable, by raising or lowering the point of attachment of the whiffletree into the various holes in the arm $r$. Thus any desired amount of leverage may be obtained from the draft of the horse, and used to hold the rake-teeth in position to work and act in conjunction with the force applied by the operator. When the rake is loaded and the operator wishes to discharge it he presses forward the foot-lever and rest $o'$. This force changes the angles between the sides of the compound lever $n\ o\ p\ q$ from the position shown in Fig. 2 to that shown in Fig. 3, and the teeth are elevated and discharge the hay.

It will be seen, by this arrangement, that the points of the rake-teeth are free to follow into any depression or over any elevations passed over by the wheels or the horse without affecting the working condition of the teeth; and that the rake-head may work laterally and longitudinally when held in its working position.

The auxiliary teeth $x\ x$, projecting from the end teeth $e\ e$, hold the hay from being drawn endwise from the teeth of the rake when being collected. The hook D, in connection with the stud in the arm $p$, holds the rake-head in position when going from field to field. The hook D may be attached or detached from the stud by the operator in the seat.

What I claim as my invention, and desire to secure by Letters Patent, is—

1. The combination of the rake-head $d$, when pivoted to the shafts A A, which are pivoted to the axle $k$ by means of the rocking braces $i\ i$ turning on the pivot $j$ to allow the rake to follow the irregularities of the ground, substantially as described.

2. In combination with the above, the springs $l\ l$ when arranged on the axle to support the shafts of the rake and allow them to operate, substantially as described.

3. The auxiliary teeth $x\ x$ at the ends of the rake, in combination with a wire-tooth rake, substantially as described, for the purpose set forth.

4. The combination of the rake-head with a lock-joint, formed substantially as described, when one end of the lock-joint is hinged to a pivoted support by which, while the lever is locked, the rake can be held in position and still be allowed to follow the inequalities of the ground, substantially as and for the purpose described.

GEORGE E. BURT.

Witnesses:
E. A. HILDRETH,
S. B. HILDRETH.